(12) United States Patent
Tamagawa

(10) Patent No.: US 8,840,973 B2
(45) Date of Patent: Sep. 23, 2014

(54) RETARDATION FILM, POLARIZING PLATE, LIQUID CRYSTAL DISPLAY AND MANUFACTURING METHOD OF RETARDATION FILM

(75) Inventor: Minori Tamagawa, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 1180 days.

(21) Appl. No.: 12/048,266

(22) Filed: Mar. 14, 2008

(65) Prior Publication Data

US 2008/0233311 A1  Sep. 25, 2008

(30) Foreign Application Priority Data

Mar. 20, 2007 (JP) ................. 2007-071878

(51) Int. Cl.
| | |
|---|---|
| C09K 19/00 | (2006.01) |
| B29D 11/00 | (2006.01) |
| C08K 5/00 | (2006.01) |
| C08J 5/18 | (2006.01) |
| C08L 1/14 | (2006.01) |
| C08K 5/10 | (2006.01) |
| G02F 1/13363 | (2006.01) |

(52) U.S. Cl.
CPC ......... B29D 11/0074 (2013.01); *C08J 2301/10* (2013.01); *C08K 5/10* (2013.01); C08K 5/0016 (2013.01); C08J 5/18 (2013.01); *G02F 1/133634* (2013.01); *C08L 1/14* (2013.01)
USPC ........................................ 428/1.31; 264/1.34

(58) Field of Classification Search
None
See application file for complete search history.

(56) References Cited

U.S. PATENT DOCUMENTS

| | | | | |
|---|---|---|---|---|
| 6,731,357 | B1 * | 5/2004 | Tachibana et al. | ............... 349/96 |
| 7,839,569 | B2 * | 11/2010 | Ohgaru et al. | ........... 359/489.01 |
| 2006/0069192 | A1 * | 3/2006 | Nakamura et al. | ............ 524/306 |
| 2007/0139783 | A1 * | 6/2007 | Furuya et al. | ................. 359/606 |
| 2007/0258141 | A1 | 11/2007 | Ohgaru et al. | |
| 2009/0036667 | A1 | 2/2009 | Hashimoto et al. | |

FOREIGN PATENT DOCUMENTS

| | | |
|---|---|---|
| JP | 2005-336375 | 12/2005 |
| TW | 200639455 | 11/2006 |
| WO | WO 2006/033313 | * 3/2006 ............ G02F 1/1335 |
| WO | 2006/132367 | 12/2006 |

OTHER PUBLICATIONS

Taiwan Intellectual Property Office Notice of Examination Opinion, mailing date: Jun. 25, 2013 (6 pages).
English translation of Taiwan Intellectual Property Office Notice of Examination Opinion, mailing date: Jun. 25, 2013 (6 pages).
Korean Office Action, Application No. 10-2009-7019311, date of mailing: Jan. 9, 2014.
English translation of Korean Office Action, Application No. 10-2009-7019311, date of mailing: Jan. 9, 2014.

* cited by examiner

*Primary Examiner* — J. L. Yang
(74) *Attorney, Agent, or Firm* — Lucas & Mercanti, LLP

(57) ABSTRACT

A retardation film comprising a cellulose derivative and a plasticizer, wherein a total haze, Htotal, of the retardation film meets the following condition: $0.1\% \leq Htotal \leq 0.4\%$; and a ratio of a internal haze, Hi, to the total haze, Hi/Htotal, of the retardation film meets the following condition: $Hi/Htotal \leq 0.5$.

8 Claims, No Drawings

RETARDATION FILM, POLARIZING PLATE, LIQUID CRYSTAL DISPLAY AND MANUFACTURING METHOD OF RETARDATION FILM

This application is based on Japanese Patent Application No. 2007-071878 filed on Mar. 20, 2007 in Japanese Patent Office, the entire content of which is hereby incorporated by reference.

FIELD OF THE INVENTION

The present invention relates to a retardation film, a polarizing plate, a liquid display and a manufacturing method of a retardation film.

BACKGROUND OF THE INVENTION

In recent years, a liquid crystal display having a larger screen and higher quality is prevailing and high quality is required with respect to a front contrast and a viewing angle property. Further, in accordance with popularization of cell phones and notebook personal computers, films of thinner thicknesses are desired.

A retardation film has been utilized to broaden the viewing angle of a liquid crystal display, for example, a cellulose derivative film is stretched to obtain retardation and then saponified to be laminated with a PVA polarizer film, whereby a polarizing plate provided with a function of retardation film is obtained.

However, since this cellulose derivative film is provided with retardation by stretching, the haze tends to be increased resulting in a problem of decrease in front contrast of a liquid crystal display.

Specifically in the case of a cellulose derivative film obtained by a solution casting method, since distribution of resin and plasticizer in the film is liable to be inhomogeneous when the film is stretched in the presence of a large amount of residual solvent, uneven force may be applied to the film when the film is stretched, which may cause a problem of too much haze.

In patent document 1, a method in which more retardation is obtained by use of a retardation increasing agent while decreasing haze as a total has been disclosed. However, although haze could be reduced in this method, it did not result in improvement of front contrast of a liquid crystal display. In Patent Document 2, a method to reduce haze has been disclosed, however, further higher front contrast is desired in these days, and, when a film is formed as disclosed in this patent document, adhesion of films may occur or, when the film is used in a liquid crystal display, color unevenness in reflected light from a liquid crystal display screen displaying black (hereafter also referred to as "reflection color unevenness") tends to occur due to formation of streaks on the film.
Patent Document 1 Japanese Patent Application Publication Open to Public Inspection (hereafter referred to as JP-A) No. 2006-154803
Patent Document 2 JP-A No. 2003-170492

SUMMARY OF THE INVENTION

An object of the present invention is to provide a retardation film and a polarizing plate which enable producing a liquid crystal display exhibiting high front contrast and reduced reflection color unevenness and a liquid crystal display exhibiting the same.

One of the aspects of the present invention to achieve the above object is a retardation film comprising a cellulose derivative and a plasticizer, wherein a total haze, Htotal, of the retardation film meets the following condition: $0.1\% \leq Htotal \leq 0.4\%$; and a ratio of a internal haze, Hi, to the total haze, Hi/Htotal, of the retardation film meets the following condition: $Hi/Htotal \leq 0.5\%$.

DESCRIPTION OF THE PREFERRED EMBODIMENTS

The above object of the present invention is achieved by the following structures.

(1) A retardation film comprising a cellulose derivative and a plasticizer,
wherein
a total haze, Htotal, of the retardation film meets the following condition:

$0.1\% \leq Htotal \leq 0.4\%$; and a ratio of a internal haze, Hi, to the total haze, Hi/Htotal, of the retardation film meets the following condition:

$Hi/Htotal \leq 0.5$, wherein
the total haze (%) represents a haze measured according to a method of JIS K7136 (identical with ISO 14782: 1999); and
the internal haze (%) represents a haze obtained by the following steps:
(i) measuring a haze of the retardation film by applying glycerin on both surfaces of the retardation film and sandwiching the retardation film with two glass plates each having a thickness of 1.3 mm; and
(ii) measuring a haze of the two glass plates by putting the two glass plates together on top of each other while applying glycerin between the two glass plates; and
(iii) subtracting the haze obtained in step (ii) from the haze obtained in step (i) to give the internal haze.

(2) The retardation film of Item (1), wherein the ratio of the internal haze to the total haze of the retardation film meets the following condition:

$0.2 \leq Hi/Htotal \leq 0.5$ (3) The retardation film of Item (1) or (2), wherein the retardation film comprises a polyester plasticizer having a number average molecular weight of 300 or more and less than 2000.

(4) A polarizing plate comprising the retardation film of any one of Items (1) to (3).

(5) A liquid crystal display comprising the retardation film of any one of Items (1) to (3).

(6) A method of producing a retardation film comprising a cellulose derivative and a plasticizer comprising the steps of:
(a) dissolving a cellulose derivative and a plasticizer in an organic solvent to form a dope;
(b) casting the dope on a metal support to form a web;
(c) drying the web on the metal support;
(d) peeling the web from the metal support;
(e) heat treating the peeled web at a temperature of Tg(a)+10° C. to Tg(a)+40° C., Tg(a) being a glass transition temperature of the retardation film;
(f) stretching the heat treated web; and
(g) winding the web in a role,
wherein
a total haze, Htotal, of the retardation film meets the following condition:

$0.1 \leq Htotal \leq 0.4\%$; and a ratio of a internal haze, Hi, to the total haze, Hi/Htotal, of the retardation film meets the following condition;

$$Hi/H\text{total} \leq 0.5$$

wherein the total haze (%) represents a haze measured according to a method of JIS K7136 (identical with ISO 14782: 1999); and the internal haze (%) represents a haze obtained by the following steps:

(i) measuring a haze of the retardation film by applying glycerin on both surfaces of the retardation film and sandwiching the retardation film with two glass plates each having a thickness of 1.3 mm; and (ii) measuring a haze of the two glass plates by putting the two glass plates together on top of each other while applying glycerin between the two glass plates; and (iii) subtracting the haze obtained in step (ii) from the haze obtained in step (i) to give the internal haze.

(7) The method of Item (6), wherein the ratio of the internal haze to the total haze of the retardation film meets the following condition:

$$0.2 \leq Hi/H\text{total} \leq 0.5$$

(8) The method of Item (6), wherein the retardation film comprises a polyester plasticizer having a number average molecular weight of 300 or more and less than 2000.

The present invention provides a retardation film and a polarizing plate which enable producing a liquid crystal display exhibiting high front contrast and reduced reflection color unevenness and a liquid crystal display exhibiting the same a polarizing plate and a liquid crystal display enabling liquid crystal display exhibiting high front contrast.

It was found in the present invention that, in the effort to reduce the haze of the retardation film, reduction of haze in the interior of the film (hereinafter referred to as internal haze) is effective to improve the front contrast of a liquid crystal display.

Also, it was found that a heat treatment process at a higher temperature before stretching to obtain retardation of the film is effective in order to reduce the internal haze of the film.

Generally, a heat treatment process at a higher temperature before stretching has not been carried out, since there remains a large amount of residual solvent in the film before stretching and, when the film is heat treated at a higher temperature, additives such as a plasticizer tend to bleed out, resulting in increase of haze.

However, in the present invention, it has become possible to restrain bleed out of an additive even when the film is heat treated at a higher temperature in the presence of a large amount of a residual solvent by employing a polyester plasticizer.

In the following, the best mode to practice the present invention will be detailed.

<Haze of Retardation Film>

The retardation film of the present invention has the total haze, Htotal, of 0.1%≤Htotal≤0.4% and a ratio of the internal haze, Hi, to the total haze of Hi/Htotal≤0.5, and preferably 0.2≤Hi/Htotal≤0.5.

Total haze (Htotal) is a haze value (%) measured base on JISK 7136 (identical with ISO 14782: 1999), and the internal haze (%) represents a haze obtained by the following steps:

(i) measuring a haze of the retardation film by applying glycerin on both surfaces of the retardation film and sandwiching the retardation film with two glass plates each having a thickness of 1.3 mm (Micro Slide Glass, product No. S 9213, manufactured by Matsunami Glass Ind., Ltd.); and (ii) measuring a haze of the two glass plates by putting the two glass plates together on top of each other while applying glycerin between the two glass plates; and (iii) subtracting the haze obtained in step (ii) from the haze obtained in step (i) to give the internal haze (%).

Haze of retardation film of the present invention was measured for a film having been kept under an environment of 23° C. and 55% RH for 24 hours under the same environment by use of a haze turbidimeter (NDH 2000, manufactured by Nippon Denshoku Industries Co., Ltd.).

Haze of retardation film of the present invention is preferably 0.1%≤Htotal≤0.3% and more preferably 0.1%≤Htotal≤0.2%.

It is generally said to be preferable that the haze is preferably lower. However, when the haze is reduced, adhesion of films or a trouble in the production step tends to occur. Only the reduction of the total haze of a retardation film is not sufficient to improve the front contrast or to decrease the reflection color unevenness of a liquid crystal display. It was found in the present invention that, not only the reduction of the total haze, but also the balance between the total haze and the internal haze affects the front contrast and the reflection color unevenness in black display of the liquid crystal display <Retardation in Retardation Film>

The retardation film of the present invention means a film having an in-plane retardation Ro of 40-300 nm and a retardation in the thickness direction of the film Rt of 90-400 nm. The in-plane retardation Ro is preferably 40-150 nm and the retardation in the thickness direction of the film Rt is preferably 90-350 nm.

$$Ro = (nx - ny) \times d \quad \text{Equation (i)}$$

$$Rth = \{(nx + ny)/2 - nz\} \times d \quad \text{Equation (ii)}$$

(wherein, nx is the largest in-plane refractive index, ny is the in-plane refractive index in the direction orthogonal to the nx direction, nz is the refractive index in the thickness direction of the film and d is the thickness of the film (nm).)

Ro and Rt are determined as follows: The average refractive index of the specimen is determined first employing an Abbe refractometer and a three dimensional refractive index measurement of the specimen which has been allowed to stand at 23° C. under 55% RH for 24 hours is carried out employing an automatic birefringence meter KOBRA-21ADH (produced by Oji Keisoku Co.) at a wavelength of 590 nm. Ro and Rt are calculated from the obtained retardation value and the average refractive index.

In the present invention, luminance was measured from the vertical direction of the display image plane of a liquid crystal display at white display and at black display by use of EZ-Contrast 160D, manufactured by ELDIM Corp., and the ratio of the luminance at white display to the luminance at black display was defined as front contrast.

The retardation film of the present invention contains a cellulose derivative and a plasticizer as basic constituents and a variety of other additives. Hereafter, each element of the present invention will be described in detail.

<Cellulose Derivatives>

In the present invention, as a resin preferable for the retardation film, utilized is a cellulose derivative exhibiting a low birefringency with positive wavelength dispersion.

Examples of the cellulose derivative employed in the present invention include: cellulose ethers such as methyl cellulose, ethyl cellulose, hydroxyethyl cellulose, hydroxypropyl cellulose, and cyanoethyl cellulose; and cellulose esters such as triacetyl cellulose (TAC), diacetyl cellulose (DAC), cellulose acetate propionate (CAP) cellulose acetate butyrate (CAB), cellulose acetate phthalate, cellulose acetate trimellitate and cellulose nitrate. Of these, cellulose esters are preferable.

The number average molecular weight (Mn) of the cellulose derivative is preferably 40000-200000 and more preferably 100000-200000. The Mw/Mn (Mw being weight average molecular weight) ratio of the cellulose derivative employed in the present invention is preferably 4.0 or less, and more preferably 1.4-2.3 more preferably.

In the present invention, the mean molecular weight and molecular weight distribution of the cellulose derivative can be obtained by determining weight average molecular weight (Mw) and number average molecular weight (Mn) by means of gel permeation chromatography (GPC), followed by calculating the ratio.

The measuring conditions are as follows:
Solvent: Methylene chloride
Column: Shodex K806, K805, K803G (manufactured by Showa Denko KK). Three columns were used in connection
Column temperature: 25° C.
Sample concentration: 0.1 mass %
Detector: RI Model 504 (manufactured by GL Science)
Pump: L6000 (manufactured by Hitachi Ltd.)
Flow rate: 1.0 ml/min
Calibration curve: Standard polystyrene STK (manufactured by Tosoh Corporation). Calibration curve using 13 samples of Mw=1,000,000 to 500. 13 samples should preferably be spaced approximately equally.

The cellulose derivative film employed in the present invention is preferably a cellulose ester having an acyl group containing 2 to 4 carbon atoms as a substituent and simultaneously satisfies Equations (i) and (ii) (where X is the substitution degree of an acetyl group and Y is the substitution degree of a propionyl group or a butyryl group).

$$2.0 \leq X+Y \leq 3.0 \quad \text{Equation (i)}$$

$$0 \leq X \leq 1.5 \quad \text{Equation (ii)}$$

Specifically, preferable is a cellulose acetate propionate of $2.0 \leq X+Y \leq 2.6$, $0 \leq X \leq 1.2$, $0.8 \leq Y \leq 2.6$ (where X+Y is the total acyl group substitution degree). The acyl group substitution degree can be determined through a method prescribed in ASTM-D817-56. The Portions being not substituted by an acyl group usually exist as hydroxyl groups. These cellulose esters can be synthesized by well-known methods in the art.

<Glass Transition Temperature of Retardation Film Tg(a)>

The glass transition temperature Tg(a) of the retardation film of the present invention means the glass transition temperature (hereinafter also referred to as Tg) as the whole film containing the cellulose derivative, a plasticizer and other additive.

Tg Measurement is Carries out as Follows:

Ten mg of a film or a pellet is melted at 300° C. under a nitrogen stream of 300 cm³/minute, followed by rapid quenching in liquid nitrogen. The quenched sample is set in a differential scanning calorimeter (DSC8230, produced by Rigaku Corp.) and heated with a heating rate of 10° C./minute under a nitrogen stream of 100 cm³/minute to detect Tg. The Tg was determined as the average temperature of the temperature at which the curve starts to deviate from the base line and the temperature at which the curve returns to the base line again. The starting temperature of the measurement is set to a temperature more than 50° C. lower than the Tg to be determined, while the heat starting temperature is ambient temperature.

<Plasticizer>

As the plasticizer used in the present invention, preferable is a polyester plasticizer having a number average molecular weight of 300 or more and less than 2000, in order not to cause haze in the film or not to bleed out nor evaporate from the film.

<<(Polyester Plasticizer Having Number Average Molecular Weight of 300 or More and Less Than 2000)

The polyester plasticizer is not specifically limited, however, a polyester plasticizer having an aromatic ring or a cycloalkyl ring in the molecule thereof is preferably employed.

For example, an aromatic terminal polyester plasticizer represented by following Formula (1) are preferable, though the polyester plasticizer is not specifically limited.

$$B\text{-}(G\text{-}A)n\text{-}G\text{-}B \quad \text{Formula (1)}$$

wherein B is a benzene monocarboxylic acid residue, G is an alkylene glycol residue having 2-12 carbon atoms, an aryl glycol residue having 6-12 carbon atoms or an oxyalkylene glycol residue having 4-12 carbon atoms, A is an alkylenedicarboxylic acid residue having 4-12 carbon atoms or an aryldicarboxylic acid residue having 6-12 carbon atoms, and n is an integer of 1 or more.

The polyester plasticizer is constituted by the benzene monocarboxylic acid residue represented by B, the alkylene glycol residue, the oxyalkylene glycol residue or the aryl glycol residue represented by G, and an alkylenedicarboxylic acid residue or an aryldicarboxylic acid residue represented by A, in Formula (1).

As the benzene monocarboxylic acid component of the polyester plasticizer employed in the present invention, for example, benzoic acid, p-tert-butylbenzoic acid, o-toluic acid, m-toluic acid, p-toluic acid, dimethylbenzoic acid, ethylbenzoic acid, n-propylbenzoic acid, aminobenzoic acid and acetoxybenzoic acid are applicable. They can be employed alone or in combination.

Examples of the alkylene glycol with 2-12 carbon atoms as the component of the polyester plasticizer employed in the present invention include: ethylene glycol, 1,2 propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol and 1,12-octadecanediol. These glycols are employed alone or in mixture of two or more kinds thereof.

An alkylene glycol with 2-12 carbon atoms is particularly preferable since compatibility with cellulose ester is excellent.

Examples of the oxyalkylene glycol component having 4-12 carbon atoms of the polyester plasticizer employed in the present invention include: diethylene glycol, triethylene glycol, tetraethylene glycol, dipropylene glycol and tripropylene glycol. These glycols can be employed singly or in combination of two or more kinds.

Examples of the alkylenedicarboxylic acid component having 4-12 carbon atoms of the polyester plasticizer employed in the present invention include: succinic acid, maleic acid, fumaric acid, glutaric acid, adipic acid, azelaic acid, sebacic acid and dodecanedicarboxylic acid. These acids can be employed alone or in combination of two or more kinds.

The examples of the arylenedicarboxylic acid component having 6 to 12 carbon atoms include: phthalic acid, tetraphthalic acid, 1,5-naphthalenedicarboxylic acid and 1,4-naphthalenedicarboxylic acid.

The suitable number average molecular weight of the polyester plasticizer to be employed in the present invention is preferably 300-1500, and more preferably 400-1000.

The acid value and the hydroxyl group value are at most 0.5 mg KOH/g and at most 25 mg KOH/g, respectively, and preferably at most 0.3 mg KOH/g and 15 mg KOH/g, respectively.

A normal method is used for polycondensation of the polyester plasticizer. For example, synthesis can be easily achieved by either: (i) the hot melting condensation method by direct reaction between the aforementioned dibasic acid and glycol; or esterification reaction or ester replacement reaction between the aforementioned dibasic acid or the alkyl esters thereof (e.g., methyl ester of dibasic acid) and glycols; or (ii) the method by dehalogenated hydrogen reaction between the chlorides of these acids and glycol. The polyester plasticizer employed in the present invention is preferably synthesized by the direct reaction method.

The polyester having higher distribution on the low molecular weight side provides excellent compatibility with cellulose ester. This arrangement yields a cellulose ester film characterized by reduced moisture permeability and excellent transparency after film formation.

There is no particular restriction to the molecular weight adjusting method. The conventional method can be used. For example, this adjustment can be made by blocking the molecule terminal with monovalent acid or monovalent alcohol, and by adjusting the added amount of the monovalent compound.

In this case, the monovalent acid is preferably used in view of polymer stability. Acetic acid, propionic acid, and butyric acid can be cited as examples. Selection is made of those which are not evaporated out of the system during condensation polymerization but can be easily removed out of the system when the reaction is stopped and such a monovalent acid is removed out of the system. These may be utilized as a mixture.

Further, in the case of a direct reaction, the number average molecular weight can be controlled also by judging the timing to stop the reaction based on the quantity of water evaporated out during the reaction. In addition, the molecular weight control is possible also by biasing a mol number of glycol or dibasic acid which are charged, as well as by controlling the reaction temperature.

The moleculer weight of the polyester plasticizer used in the present invention can be measured using the measuring method by the abovementioned GPC, or by terminal group analysis (hydroxy value).

Preferably 1-40% by mass of the polyester plasticizer used in the present invention is contained based on the mass of the cellulose derivative. Specifically preferably 5-15% by mass is contained.

Examples of the polyester plasticizer preferably utilized in the present invention will be shown below.

1-1

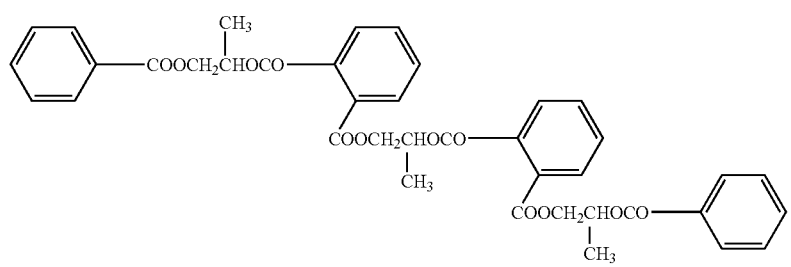

Mw: 696

1-2

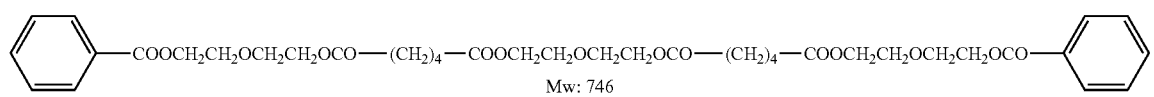

Mw: 746

1-3

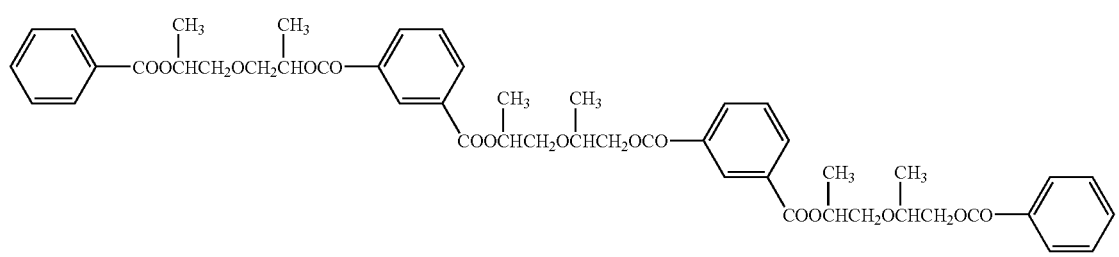

Mw: 830

-continued
1-4
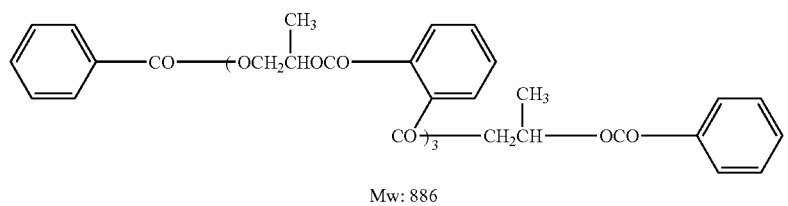
Mw: 886
1-5
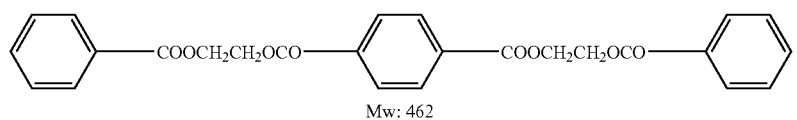
Mw: 462
1-6
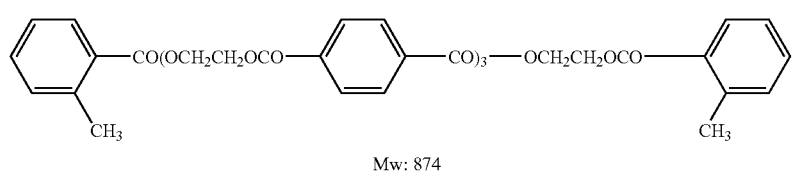
Mw: 874
1-7
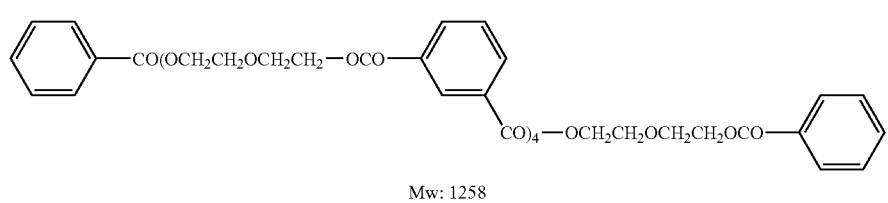
Mw: 1258
1-8
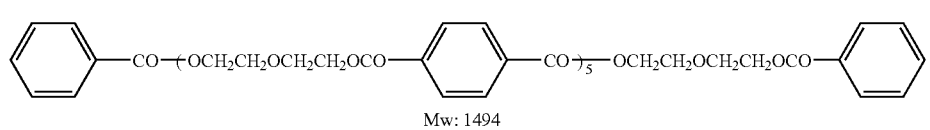
Mw: 1494
1-9
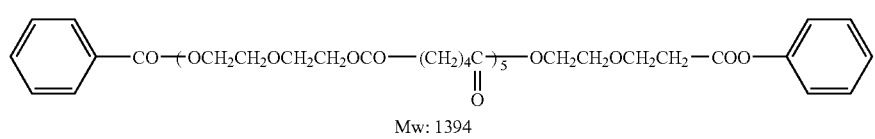
Mw: 1394
1-10
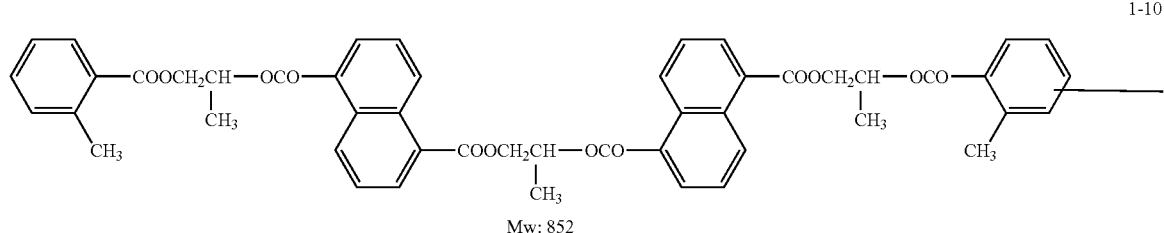
Mw: 852
1-11
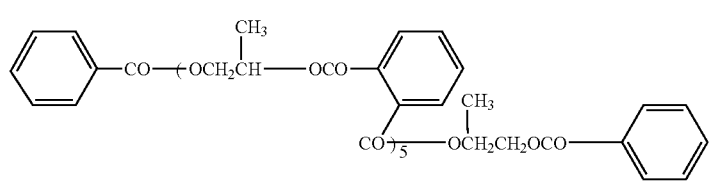
Mw: 1314
1-12
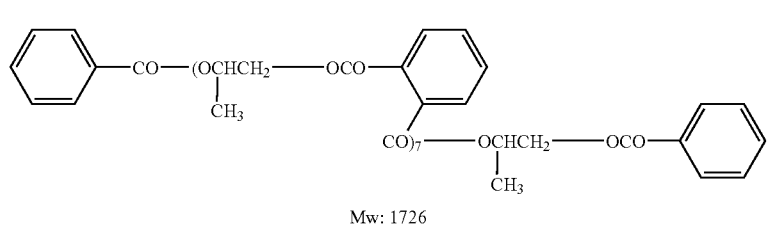
Mw: 1726

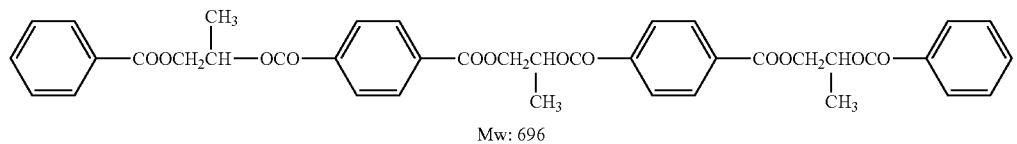
1-13
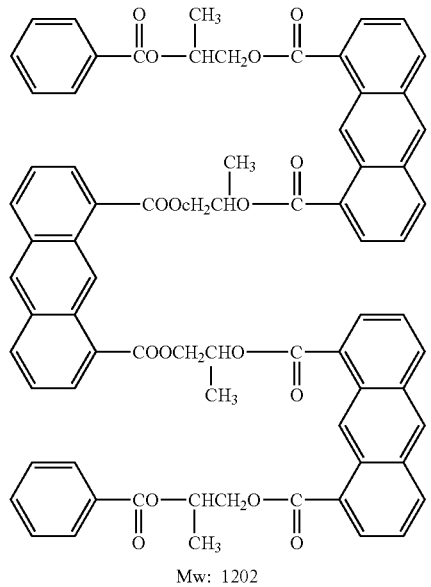
1-14
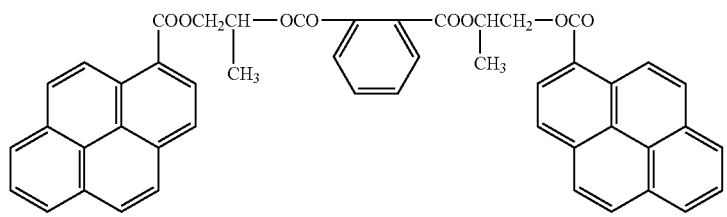
1-15
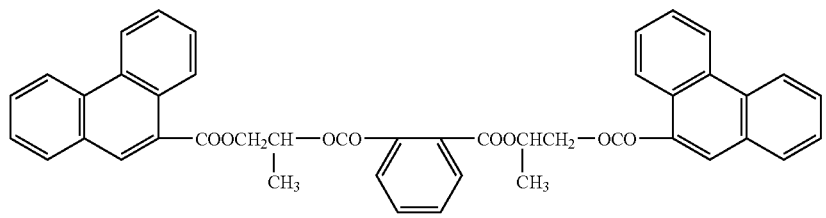
1-16
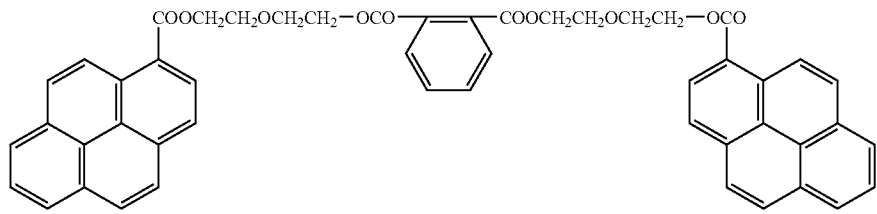
1-17

-continued

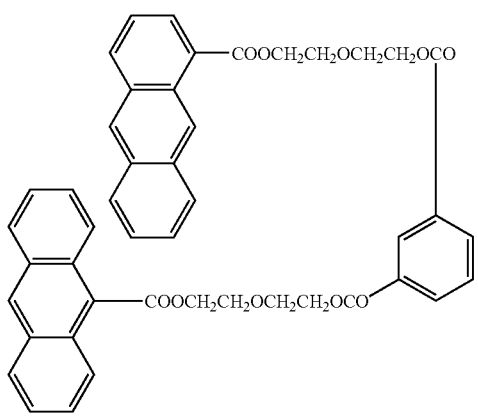
1-18

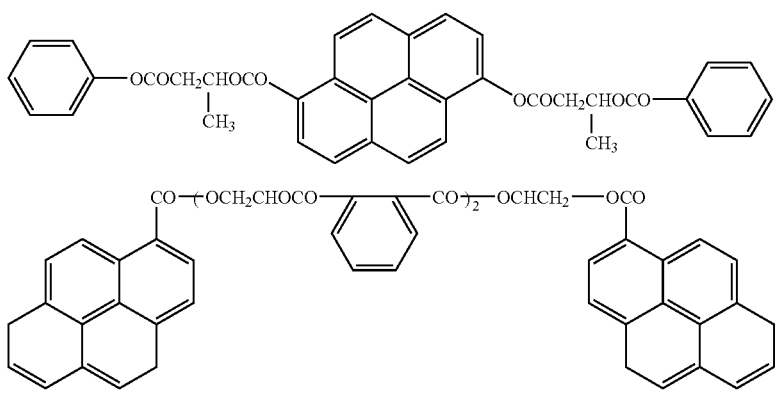
1-19

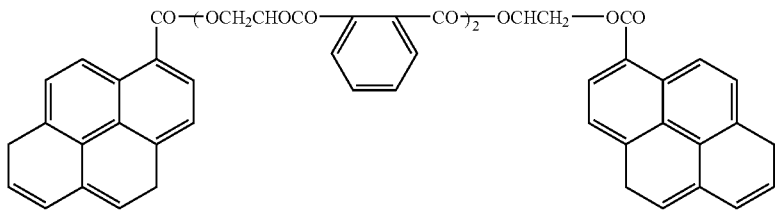
1-20

<<Other Plasticizers>>

In the addition to the polyester plasticizer, other plasticizer may be employed in combination. Examples of such a plasticizer include: a phosphate plasticizer, a phthalate ester plasticizer, a trimellitate plasticizer, a pyromellitic acid ester plasticizer, a polyalcohol ester plasticizer, a glycolate plasticizer, a citrate plasticizer, a fatty acid terminal polyester plasticizer, a carboxylic acid ester ester, a saccharose plasticizer and an acrylic polymer.

Specifically, in order to obtain the effect of the present invention, a polyalcohol ester plasticizer, a saccharose plasticizer, or an acrylic polymer is preferably contained in combination with the polyester plasticizer.

(Polyalcohol Ester Plasticizer)

The polyalcohol ester is preferably composed of an aliphatic polyalcohol of divalent or more and a monocarboxylic acid ester, and preferably contains an aromatic ring or a cycloalkyl ring in the molecule.

The polyalcohol used in the present invention is represented by Formula (2).

R1-(OH)$n$  Formula (2)

wherein, R1 represents an n valent organic group, and n represents an integer of 2 or more.

Examples of a polyalcohol include: adonitol, arabitol, ethylene glycol, di-ethylene glycol, triethylene glycol, tetraethylene glycol, 1,2-dihydroxypropane, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, pentaerythritol and dipentaerythritol. Of these, specifically preferable are trimethylolpropane and pentaerythritol. However, the present invention is not limited thereto.

The monocarboxylic acid used in the polyalcohol ester employed in the present invention is not specifically limited and aliphatic monocarboxylic acids, alicyclic monocarboxylic acids and aromatic monocarboxylic acids well known in the art are applicable.

Specifically, alicyclic monocarboxylic acid and aromatic monocarboxylic acid are preferable, since moisture permeability is suppressed and storage ability is improved. Examples of the preferable monocarboxylic acid are listed below but the present invention is not limited thereto.

A straight chain or branched chain carboxylic acid having 1 to 32 carbon atoms is preferably employed. The number of carbon atoms is more preferably 1-20, and specifically preferably 1-10.

Acetic acid is preferably used for raising the compatibility with a cellulose ester, and the mixing of acetic acid with another carboxylic acid is also preferable.

As the preferable aliphatic monocarboxylic acid, saturated aliphatic acids such as acetic acid, propionic acid, butylic acid, valeric acid, caproic acid, enantic acid, caprylic acid, pelargonic acid, capric acid, 2-ethyl-hexane acid, undecylic acid, lauric acid, tridecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid and lacceric acid; and unsaturated aliphatic acids such as undecylenic acid, oleic acid, sorbic acid, linolic acid, linolenic acid and arachidonic acid can be exemplified.

Examples of preferable alicyclic carboxylic acid include cyclopentane carboxylic acid, cyclohexane carboxylic acid, cyclooctane carboxylic acid and derivatives thereof.

Examples of preferable aromatic carboxylic acid include ones formed by introducing an alkyl group into the benzene ring of benzoic acid such as benzoic acid and toluic acid; and an aromatic monocarboxylic acid having two or more benzene rings such as biphenylcarboxylic acid, naphthalene carboxylic acid and tetralin carboxylic acid, and derivatives thereof. Of these, benzoic acid is specifically preferable.

The molecular weight of the polyhydric alcohol ester is preferably 300-1500, and more preferably 350-750. Larger molecular weight is preferable for storage ability, while smaller molecular weight is preferable with respect to moisture permeability and compatibility with cellulose ester.

The carboxylic acid to be employed in the polyalcohol ester may be one kind or a mixture of two or more kinds of them. The OH groups in the polyalcohol may be fully esterified or a part of OH groups may be left unreacted. Specific examples of the polyalcohol ester will be listed below.

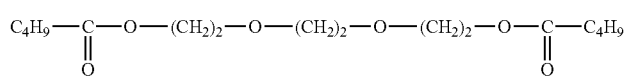

2-1

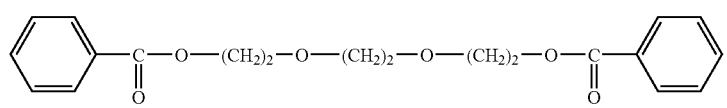

2-2

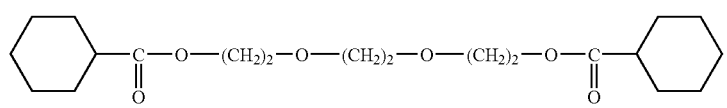

2-3

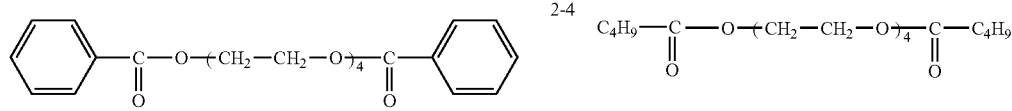

2-4   2-5

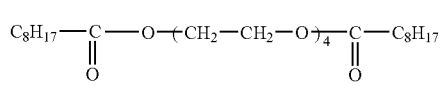

2-6

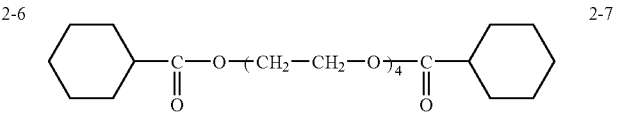

2-7

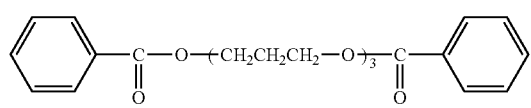

2-8

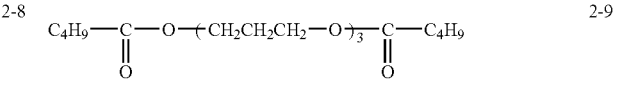

2-9

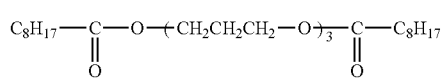

2-10

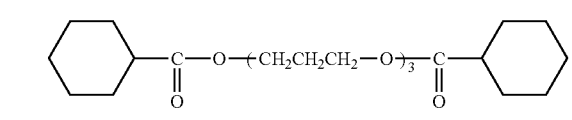

2-11

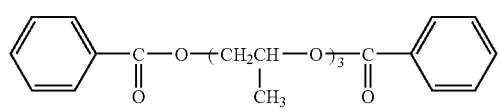

2-12

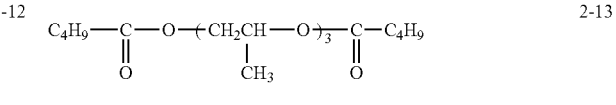

2-13

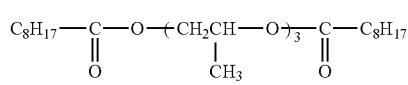

2-14

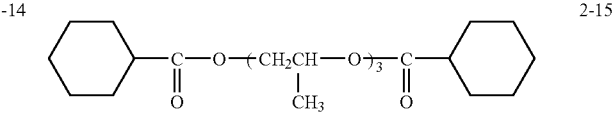

2-15

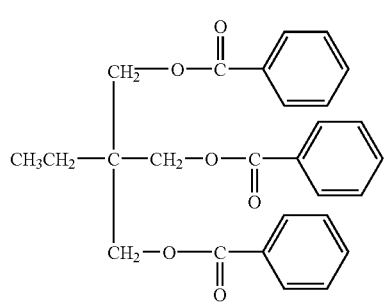

2-16

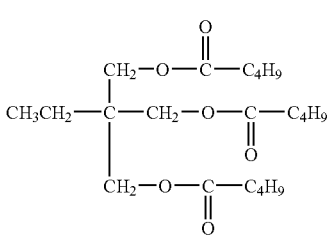

2-17

-continued
2-18
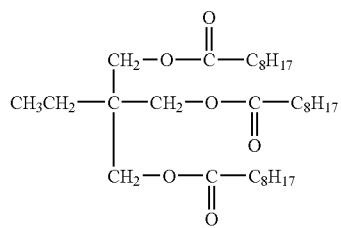
2-19
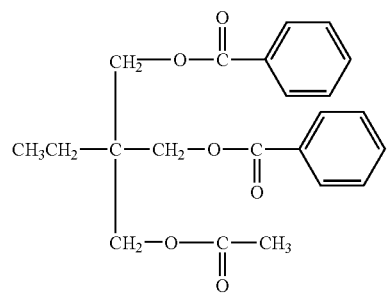
2-20
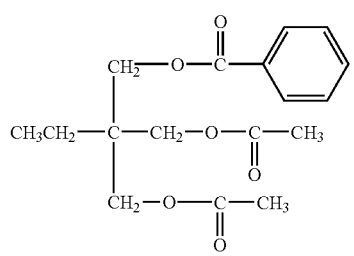
2-21
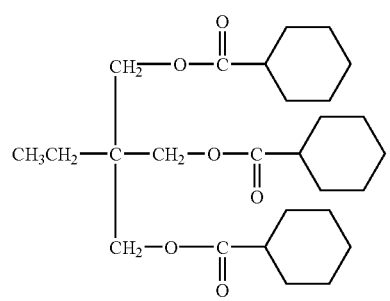
2-22
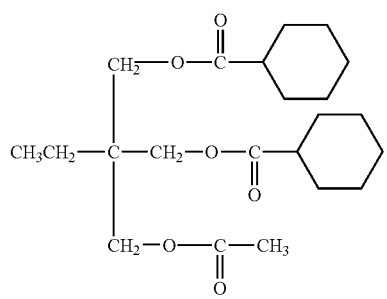
2-23
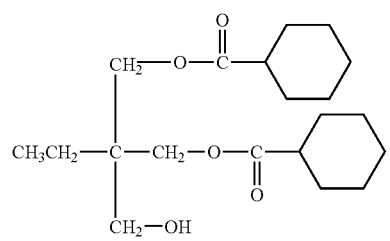
2-24
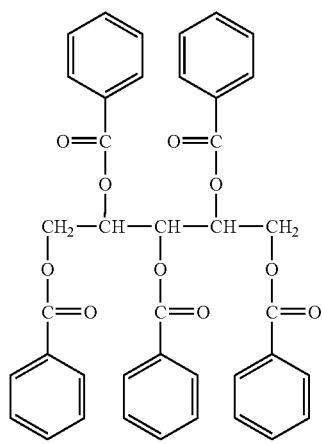
2-25
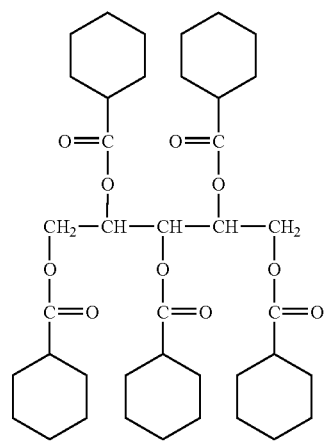

-continued
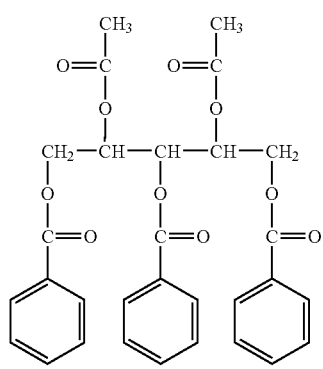 2-26
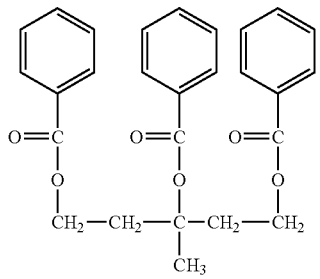 2-27
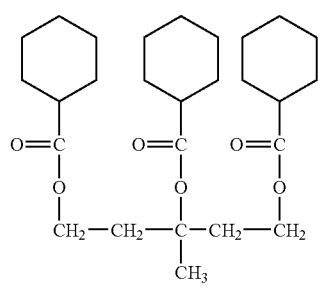 2-28
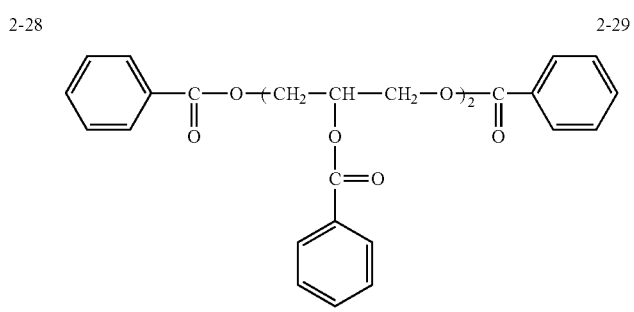 2-29
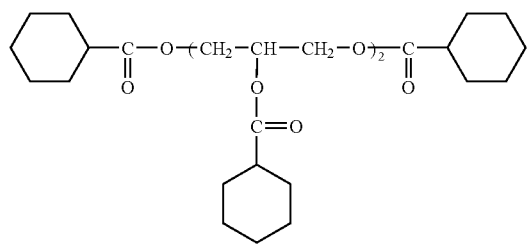 2-30
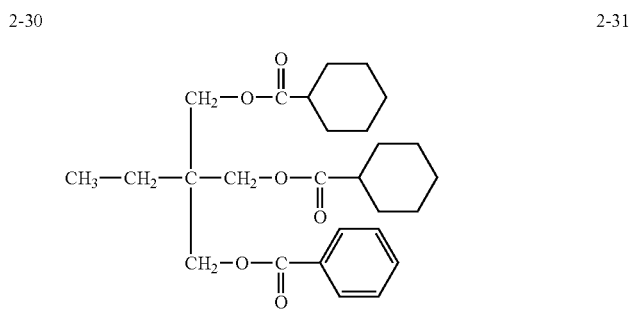 2-31
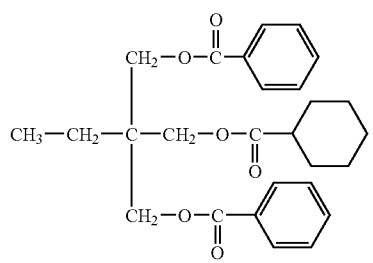 2-32
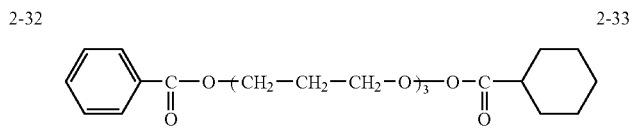 2-33
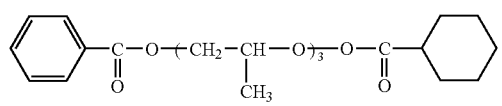 2-34
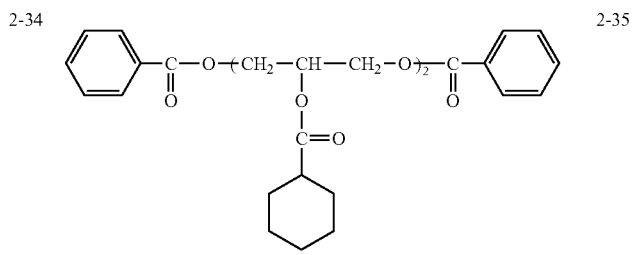 2-35

-continued
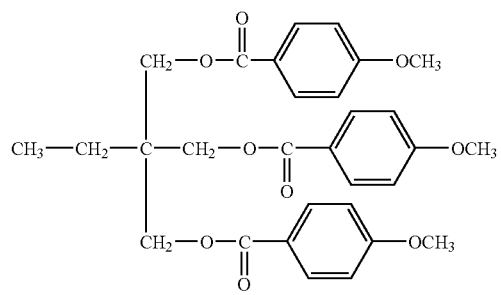
2-36
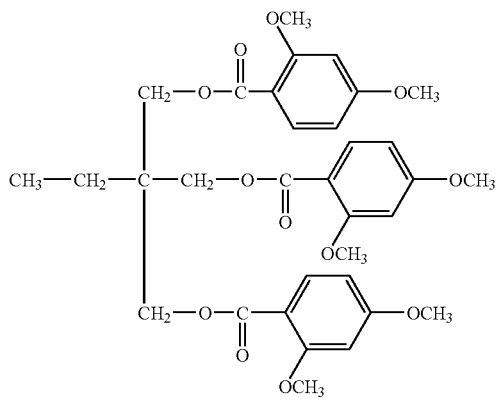
2-37
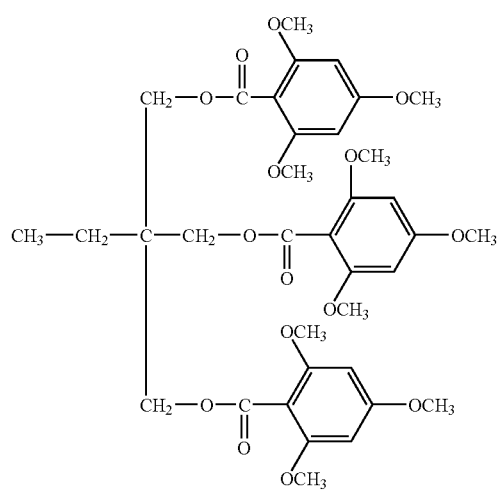
2-38
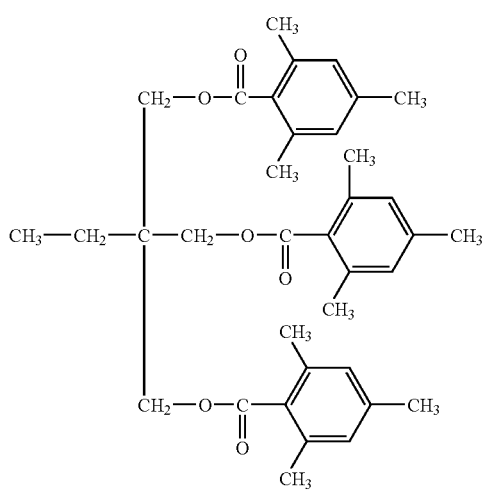
2-39
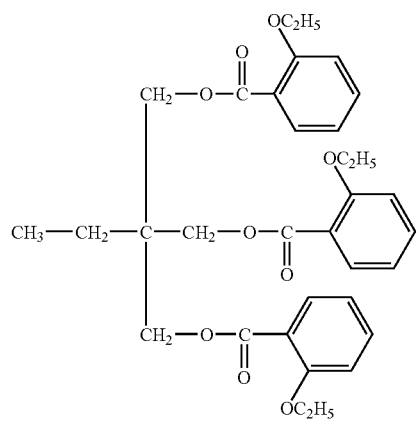
2-40
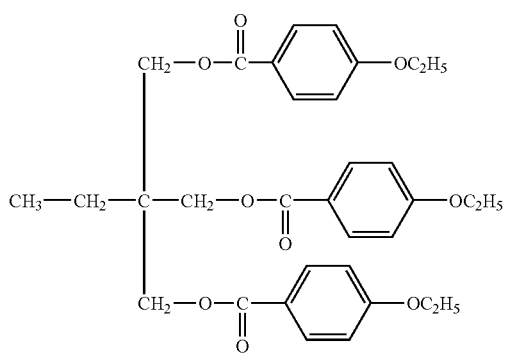
2-41

2-42

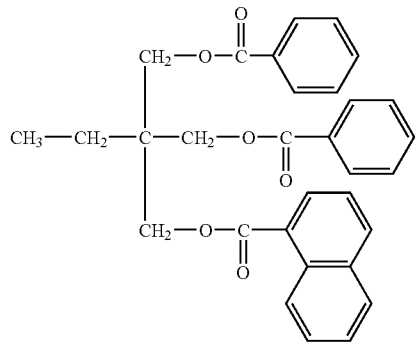

2-43

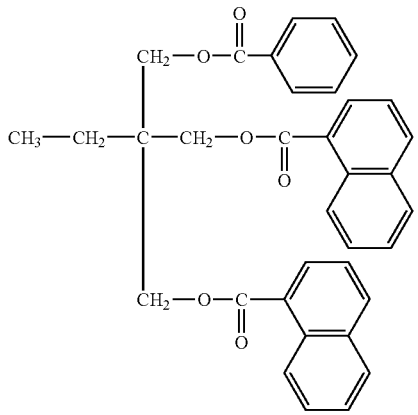

2-44

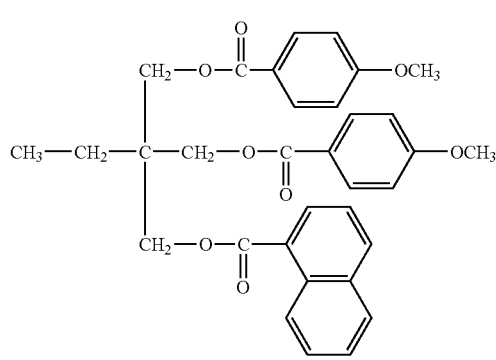

2-45

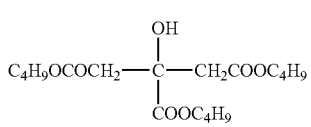

2-46

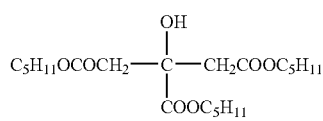

The content of the polyalcohol used in the present invention is preferably 1-15% by mass, and specifically preferably 3-10% mass, based on the mass of the cellulose derivative film.

(Saccharose Plasticizer)

The retardation film of the present invention is preferably formed by filming a composition containing a saccharose ester compound prepared by esterifying the hydroxyl groups of a saccharose compound in which 1-12 of at least one of a furanose structure and a pyranose structure are bonded.

Examples of a saccharose compound used in the present invention include: glucose, galactose, mannose, fructose, xylose, arabinose, lactose, sucrose, cellobiose, cellotriose, maltotriose and raffinose. Specifically preferable is a compound having both the furanose structure and the pyranose structure.

An example of such compound is sucrose.

The saccharose compound used in the present invention is a saccharose compound in which a part or all of the contained hydroxyl groups are esterified or a mixture thereof.

Specific compounds will be shown below.

COMPOUND 1

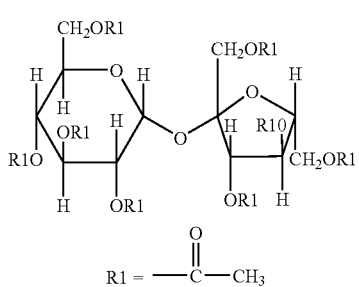

COMPOUND 2

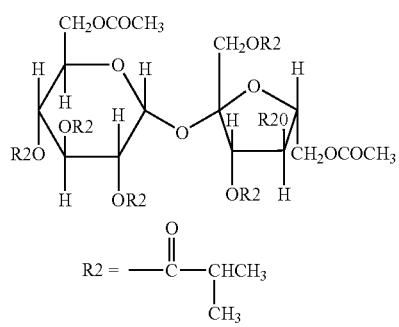

COMPOUND 3

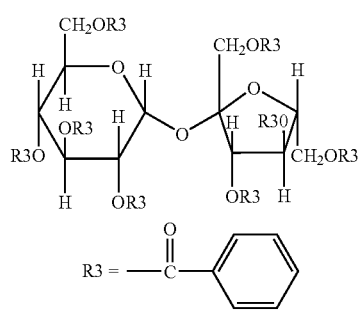

COMPOUND 4

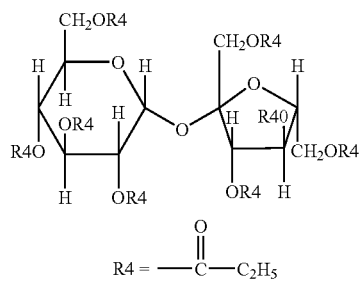

COMPOUND 5

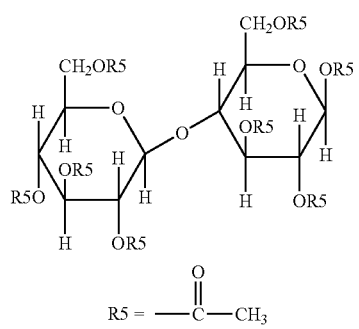

COMPOUND 6

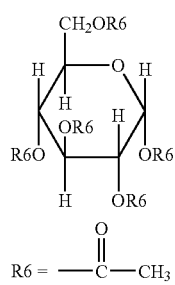

COMPOUND 7

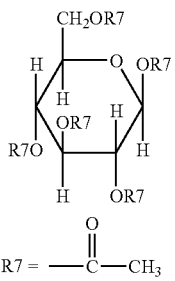

COMPOUND 8

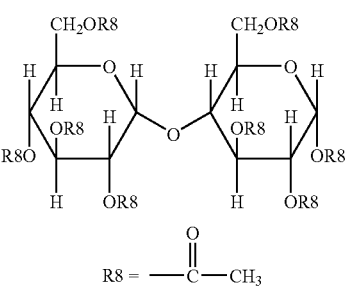

COMPOUND 9

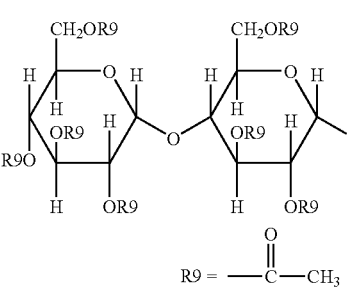

COMPOUND 10

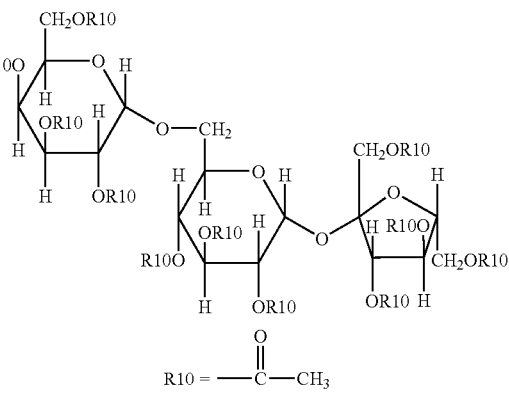

(Acrylic Polymer)

The retardation film of the present invention may further contain an acrylic polymer having a weight average molecular weight of 500-10000, preferably 500-5000.

Thus prepared cellulose derivative film exhibits excellent transparency and extremely low moisture permeability.

Such a polymer is preferably synthesized by the following method.

Examples of a polymerization method includes: a method using a peroxide polymerization initiator such as cumene peroxide or t-butylhydroperoxide; a method, using a greater amount of polymerization initiator than ordinary polymerization; a method using a chain-transfer agent such as a mercapto compound and carbon tetrachloride, in addition to the polymerization initiator; a method of using a polymerization terminator such as benzoquinone and dinitrobenzene in addition to the polymerization initiator; and a bulk polymerization method using a compound containing one thiol group and secondary hydroxyl group and/or a polymerization catalyst making a concurrent use of this compound and an organic metallic compound, as disclosed in JP-A No. 2000-128911 or 2000-344823. Any of these methods may be preferably utilized in the present invention. Specifically, the method disclosed in the above JP-A Publications is preferably used.

The acryl polymer preferably used in the present invention preferably contains an acrylate ester or a methacrylate ester by 40% by mass or more.

Examples of a monomer used as a monomer unit forming the polymer will be shown below, however, the present invention is not limited, thereto.

Examples of an, acrylate ester include: methylacrylate, ethylacrylate, (i-, n-)propyl acrylate, (n-, i-, s-, t-)butyl acrylate, (n-, i-, s-)pentyl acrylate, (n-, i-)hexyl acrylate, (n-, i-)acrylic acid heptyl acrylate, (n-, i-)octyl acrylate, (n-, i-)nonyl acrylate, (n-, i-)myristyl acrylate, cyclohexyl acrylate, (2-ethylhexyl) acrylate, benzyl acrylate, phenethyl acrylate, (ε-caprolactone) acrylate, (2-hydroxy ethyl) acrylate, (2-hydroxy propyl) acrylate, (3-hydroxy propyl) acrylate, (4-hydroxy butyl) acrylate, (2-hydroxy butyl) acrylate, p-hydroxy methylphenyl acrylate, and p-(2-hydroxy ethyl)phenyl acrylate. Examples of a methacrylic acid ester include: methacrylic acid esters wherein the aforementioned acrylic acid ester is replaced by methacrylic acid ester. Examples of an unsaturated acid include: acrylic acid, methacrylic acid, anhydrous maleic acid, crotonic acid, and itaconic acid.

Examples of an ethylenically unsaturated monomer which can form a copolymer with the acrylate ester or the methacrylate polymer include: vinyl esters such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexacarboxylate, vinyl octoate, vinyl methacrylate, vinyl crotonate, vinyl sorbate, vinyl benzoate and vinyl cinnamate.

The acrylic acid or methacrylic acid ester monomer containing the hydroxyl group is based on a copolymer composition unit, not a homopolymer composition unit. In this case, 2-20% by mass of the acrylic acid or methacrylic acid ester monomer unit containing the hydroxyl group is preferably included in the acryl polymer.

A polmer having a hydroxyl group in the side chain is also applicable. The monomer unit containing a hydroxyl group is the same as the aforementioned monomer, but the acrylic acid or methacrylic acid ester is preferred, of which preferred examples include: (2-hydroxy ethyl) acrylate, (2-hydroxy propyl) acrylate, (3-hydroxy propyl) acrylate, (4-hydroxy butyl) acrylate, (2-hydroxy butyl) acrylate, p-hydroxy methylphenyl acrylate, and p-(2-hydroxy ethyl) phenyl acrylate, and similar compounds wherein "acrylate" is replaced with "methacrylate". The above 2-hydroxyethyl acrylate and 2-hydroxyethyl methacrylate are preferably used.

The acrylate ester monomer unit or the methacrylate monomer unit containing a hydroxyl group is preferably contained by 2-20% by mass, more preferably 2-10% by mass in the polymer.

The aforementioned polymer containing 2-20% by mass of the monomer unit containing the above hydroxyl group is characterized by excellent compatibility with the cellulose derivative and retentivity, and enables to provide a retardation film exhibiting excellent dimensional stability and reduced moisture permeability. Not only that, when such a polymer is contained in a polarizing plate protective film, a polarizing plate protective film exhibiting excellent adhesion to a polarizer and enhancing the durability of the polarizing plate can be provided.

It is also preferable that at least one of the terminals of the main chain of the acrylic polymer is provided with a hydroxyl group. The method to provide a hydroxyl group at the terminal of the main chain is not specifically limited, however, it is possible to employ a method, for example: a method of using a radical polymerization initiator containing a hydroxyl group such as azobis(2-hydroxy ethylbutylate); a method of using a chain-transfer agent containing a hydroxyl group such as 2-mercaptoethanol; a method of using a polymerization terminator containing a hydroxyl group; a method of having a hydroxyl group on the terminal via living ion polymerization; or a method of bulk polymerization using a compound containing one thiol group and a secondary hydroxyl group, or a polymerization catalyst making concurrent use of this compound and an organic metallic compound, as disclosed in JP-A No. 2000-128911 or 2000-344823 The methods disclosed in these JP-A publications are specifically preferred.

The polymer prepared according to the method disclosed in the patent documents has been commercialized as "ACTFLOW" series from SOKEN CHEMICAL AND ENGINEERING, Co., Ltd., and can be preferably used.

The polymer having a hydroxyl group on the terminal of the main chain or the polymer having a hydroxyl group on the side chain provides remarkable enhancement of polymer compatibility and transparency in the present invention.

<Other Additives>

<<Antioxidant, Heat Deterioration Inhibitor>>

An antioxidant and a heat deterioration inhibitor known in the art are usable in the present invention. Specifically, a lactone compound, a sulfur-containing compound, a phenol-containing compound, a compound having double bond, a hindered amine compound, and a phosphorus-containing compound are preferably used.

For example, preferable is a compound containing a product name of "IrgafosXP40" or "IrgafosXP60" produced by Ciba Specialty Chemicals, Inc.

As the abovementioned phenol-containing compound, preferable is a compound having a structure of 2,6-dialkylphenol, for example, commercialized as "Irganox1076", or "Irganox1010" from Ciba Specialty Chemicals, Inc.

As the abovementioned phosphorus-containing compound, preferable are "SumilizerGP" from Sumitomo Chemical Co., Ltd., "ADK STAB PEP-24G", "ADK STAB PEP-36" and "ADK STAB 3010" from ADEKA Corp., "IRGAFOS P-EPQ" from Ciba Specialty Chemicals, Inc., AP Polygonum tinctorium corporation and "GSY-P101" from Sakai Chemical Industry Co., Ltd.

As the abovementioned hindered amine compound, preferable are "Tinuvin144" and "Tinuvin770" from Ciba Specialty Chemicals, Inc., and "ADK STAB LA-52" from ADEKA Corp.

As for the abovementioned sulfur-containing compound, preferable are "Sumilizer TPL-R" and "Sumilizer TP-D" from Sumitomo Chemical Co., Ltd.

As for the abovementioned compound containing a double bond, preferable are "Sumilizer GM" and "Sumilizer GS" from Sumitomo Chemical Co., Ltd.

Further, a compound having an epoxy group as disclosed in the U.S. Pat. No. 4,137,201 as an acid scavenger can also be contained.

Generally, the contents of these antioxidants or other additive are 0.05-20% by mass based on the mass of the resin which is the main component of the film, although the content is arbitrary determined depending on the recycling process.

These antioxidant and the heat deterioration inhibitor can acquire a synergistic effect when two or more kinds of compounds are used in combination, rather than using a single compound alone. For example, combination of a lactone compound, a phenol-containing compound, a compound having double bond, and a phosphorus-containing compound is preferable.

<<Retardation Adjusting Agent>>

The cellulose derivative film of the present invention may contain a compound which can adjust retardation.

As the compound to be added to adjust the retardation, an aromatic compound including two or more aromatic rings disclosed in the specification of the European patent No. 911,656 A2 may be used.

Or two or more kinds of aromatic compound may be used. Examples of the aromatic rings of the aromatic compound include aromatic hetero rings in addition to aromatic hydrocarbon rings. The aromatic hetero rings may be more preferable, and the aromatic hetero rings are generally unsaturated hetero rings. Specifically, compounds having 1,3,5-triazine ring are preferable.

<<Colorant>>

In the present invention, a colorant is preferably used.

A colorant means a dye or a pigment. In the present invention, the colorant means an agent which provides an effect to give blue tone on a liquid crystal screen, adjusts a yellow index or reduces haze of the retardation film.

Although various dye and a pigment can be used as a colorant, for example, an anthraquinone dye, an azo dye and a phthalocyanine pigment are effective.

The cellulose derivative film used in the present invention may contain an additive which is commonly contained in an ordinary cellulose derivative film.

For example, a UV absorber and particles can be cited as the additive.

Although the UV absorber used in the present invention is not specifically limited, for example, oxybenzophenone, benzotriazole, salicylate, benzophenone, cyanoacrylate, triazine, nickel complex salt or inorganic powder may be cited. A polymer UV absorber is also applicable.

Examples of a commercialized UV absorber include: TINUVIN 171, TINUVIN 234, TINUVIN 360, TINUVIN 928 (all are produced by Ciba Specialty Chemicals, Inc.), Sumisorb250 (produced by Sumitomo Chemical Co., Ltd.) and LA31 (produced by the ADEKA Corp.).

Examples of particles used in the present invention include inorganic particles such as: silicon dioxide particles, titanium dioxide particles, aluminum oxide particles, zirconium oxide particles, calcium carbonate particles, talc particles, clay particles, baked kaolin particles, baked calcium silicate particles, hydrated calcium silicate particles, aluminum silicate particles, magnesium silicate particles and calcium phosphate particles.

Particles containing silicon are preferable in view of reducing haze, and specifically silicon dioxide particles are preferable.

The average diameter of primary particles is preferably 5-50 nm and more preferably 7-20 nm. These particles are preferably contained as secondary particles having a diameters of 0.05-0.3 μm.

The content of these particles is preferably 0.05-1% by mass and specifically preferably 0.1-0.5% by mass in the cellulose derivative film. In a multilayer cellulose derivative film formed via a co-casting method, the particles of the above content are preferably contained on the surface of the film.

The particles of the silicon dioxide are commercialized, for example, by the product name of Aerosil R972, R972V, R974, R812, 200, 200V, 300, R202, OX50, TT600 and NAX50 (produced by Nippon Aerosil Co., Ltd.), and can be used.

The particles of zirconium oxide are commercialized, for example, by the product name of Aerosils R976 and R811 (produced by Nippon Aerosil Co., Ltd.), and can be used.

As examples of polymer particles, silicone resin particles, fluoro resin particles and acryl resin particles are usable. Of these, silicone resin particles are preferable and specifically those having a three-dimensional network structure are preferable. Examples of such particles include: Tospearl 103, 105, 108, 120, 145, 3120 and 240 (product names, produced by Toshiba Silicones) and can be used.

Of these, Aerosil 200V and R972V are specifically preferable in view of decreasing the friction factor of the film, while keeping the haze of the cellulose derivative film low.

<Solvent>

The cellulose derivative of the present invention is dissolved in a solvent to form a dope. This dope is cast onto a support to form a film. Since the solvent must be removed by evaporation after extrusion or casting, the solvent should preferably be volatile.

Further, preferable is a solvent which does not react with neither a reactive metal compound nor a catalyst, and does not dissolve the support for casting. Two or more solvents may be used in combination.

Moreover, a cellulose derivative and a reactive metal compound which is hydrolysis polycondensable may be separately dissolved in separated solvents, and then may be mix later.

An organic solvent which has a good solubility of the above cellulose derivatives is called as a good solvent and plays a primary role in dissolving the cellulose derivative. Among the good solvents, an organic solvent that are used in a large amount is called a main or primary (organic) solvent.

Typical good solvents are, for example, ketones such as acetone, methyl ethyl ketone, cyclopentanone, and cyclohexanone, ethers such as tetrahydrofuran (THF), 1,4-dioxane, 1,3-dioxorane, and 1,2-dimethoxyethane, esters such as methyl formate, ethyl formate, methyl acetate, ethyl acetate, amyl acetate, and γ-butyrolactone, methyl cellosolve, dimethyl imidazolynone, dimethyl formamide, dimethyl acetoamide, acetonitrile, dimethyl sulfoxide, sulfolane, nitro ethane, methylene chloride, and acetomethyl acetate.

Among the above solvents, preferable are 1,3-dioxorane, THF, methyl ethyl ketone, acetone, methyl acetate and methylene chloride.

In addition to the above organic solvent, the dope preferably contain 1 to 40 mass % of alcohol having 1 to 4 carbon atoms.

The alcohols works as a gelation solvent which gelates the web (a dope film formed by casting the cellulose derivative dope over a support is referred to as a web), when the ratio of alcohol in the web becomes greater during evaporation of the solvent from the dope cast over a metal support. The gelation strengthens the web, and facilitates separation of the web from the support. The alcohol also works to accelerate dissolution of the cellulose derivative into non-chlorinated organic solvent when the ratio of alcohols is small. The alcohol further has a role to suppress gelation, deposition or increase in viscosity of the reactive metal compound.

Examples of an alcohol having 1 to 4 carbon atoms include: methanol, ethanol, n-propanol, iso-propanol, n-buthanol, sec-buthanol, tert-buthanol, and propylene glycol monomethyl ether.

Among these, ethanol is preferable because it stabilizes the dope, and exhibits a comparatively low boiling point, good drying property, and little toxicity. These organic solvents are called poor solvents because they have no ability to dissolve cellulose derivatives alone.

The most preferable solvent which can satisfy the above conditions and dissolve cellulose derivatives at high concentration is a mixture of methylene chloride and ethyl alcohol of which ratio is in the range of 95:5 to 80:20 or a mixture of methyl acetate and ethyl alcohol of which ratio is in the range of 60:40 to 95:5.

<Film Production>

Hereafter, a desirable film-production method of a retardation film of the present invention will be explained 1) Dissolution Process:

In this process, cellulose ester is dissolved in an organic solvent which mainly contains good solvent, in a vessel while stirring a mixture of a cellulose derivative, an additive and a solvent so as to form a dope or an additive solution is mixed in a cellulose derivative solution so as to form a dope.

As a method of dissolving a cellulose derivative by ordinary pressure, although various methods such as a method of performing under the ambient pressure, a method of performing under a temperature below the boiling point of the main solvent; a method of performing under a temperature above the boiling point of the main solvent while applying a pressure; a method of performing a cooling dissolving method disclosed in JP-A Nos. 9-95544, 9-95557 and 9-95538; and a method of performing under a high pressure disclosed in JP-A No. 11-21379 can be employed. Specifically preferable is a method of performing under a temperature above the boiling point of the main solvent while applying a pressure.

The concentration of the cellulose derivative in a dope is preferably 10-35% by mass. An additive is added to the dope while dissolving or after dissolving to dissolve or disperse the additive, followed by filtering the dope with a filer media and degassing. The dope is then sent to the following manufacturing process with a feeding pump.

2) Casting Process:

In this casting process, a dope solution is sent to a high pressure die using a feeding pump (for example, a high pressure metering gear pump) and cast on an endless metal belt, for example, a stainless steel belt, or on a rotating cylindrical metal support at a prescribed position from the high pressure die.

A high pressure die is preferable since uniform thickness is more easily obtained by adjusting the slit shape at the tip of a die. A high pressure die includes a coat-hanger die and a T die either of which are preferably used. Two high pressure dies may be provided simultaneously on a metal support to increase the film forming rate by dividing the amount of dope and by superimposing two film layers or it is also preferable to obtain a film of a laminated structure by a multi casting method to conduct casting of plural dope solutions simultaneously.

3) Solvent Evaporation Process:

A web (a film before finalized as a retardation film still, containing much solvent is referred to as a web) is heated on a metal support to evaporate the contained solvent until the web becomes peelable.

The following methods may be used to promote evaporation of a solvent from a web: blowing from above the web; heating a metal support from a back surface using a liquid heat medium; and heating from both surfaces of a web using radiant heat. Among these methods, the method to heat a metal support from a back surface using a liquid heat medium is preferable with respect to drying efficiency, however, the above methods may also be used in combination. In the case of heating a back surface using a liquid heat medium, it may be preferable to heat at a temperature lower than the boiling point of the main solvent of an organic solvent used in the dope or lower than the boiling point of an organic solvent having a lowest boiling point.

4) Peeling Process

A web dried on a metal support is peeled from the metal support at a prescribed position. The peeled web is sent to the next process. If the amount of the residual solvent (below-mentioned formula) in a web is too much at the point of peeling, peeling is difficult and if the amount of the residual solvent is too small, partial peeling of the web may occur prior to the point of peeling.

As an alternate method to increase the formation rate of a web (by peeling while an amount of the residual solvent is as much as possible, the formation rate of a web can be increased), a gel casting method may be used. This method enables a higher forming rate of a web since a web is peeled while the web still contains a high percentage of solvent. In a gel casting method, the gel is formed by: adding a considerable amount of a poor solvent in a dope which forms a gel after casting the dope on a metal support; or lowering the temperature of the metal support to facilitate formation of a gel. By forming a gel, the mechanical strength of a web increases and an early peeling of the web becomes possible, resulting in a higher web formation rate.

With regard to the amount of the residual solvent on the metal support, it may be preferable to peel the web in a range of 5 to 150% by mass depending on the degree of a drying condition and a length of the metal support. In the case of peeling it when the amount of the residual solvent is too much, if the web is to soft, the web may lose a flatness at the time of peeling, or apt to cause twist or longitudinal streak by the peeling tension. Accordingly, the amount of the residual solvent when peeling is determined in view of both of an economic speed and a quality. In the present invention, the temperature at the point of peeling from the metal support is preferably controlled between −50° C. and 40° C., is more preferably 10° C. to 40° C., and is still more preferably 15° C. to 30° C.

The amount of residual solvent at the point of peeling on the metal support is preferably 10 to 150% by weight, is more preferably 10 to 120% by weight.

The amount of the residual solvent is defined by the following equation:

$$\text{Residual solvent content(\% by mass)} = \{(M-N)/N\} \times 100$$

where M represents weight of samples of the web taken during or after the manufacturing process, and N represents weight of the same sample after it has been dried at 110° C. for 3 hours.

5) Drying and Stretching Process:

After peeling, the web is dried using a drying equipment which conveys the web by passing it alternately among a plurality of rolls arranged in the drying equipment, and/or a tenter apparatus which clips the both ends of a web and conveys it with a clip, thereby drying the web.

In the present invention, it is preferable to stretch using a tenter apparatus as a method of stretching 1.0 to 2.0 times in a width direction between clips.

In the present invention, the web is preferably heat treated before stretching at a temperature of Tg(a)+10° C. to Tg(a)+40° C., Tg(a) being the glass transition temperature of the retardation film.

Furthermore, biaxial stretching in a longitudinal direction and a transverse direction are preferable. In the biaxial stretching, by slacking to 0.8 to 1.0 times in the longitudinal direction, a desired retardation value can be obtained. A stretching ratio is set up according to a target optical characteristics (Ro, Rt). Moreover, when manufacturing a retardation film of the present invention, a uniaxial stretching can also be carried out in the longitudinal direction. A temperature in the case of stretching is preferably Tg(a)–10° C. to Tg(a).

A general method of drying is to blow hot air on both surfaces of the web, however, a method to apply microwave is also possible. Usually, drying is carried out between 40 and 250° C. Drying temperature, amount of airflow, and drying duration depend on the type of solvent used in the web. Drying conditions may be appropriately selected depending on the type or the combination of solvent.

Thus obtained web is wound in a roll and thus a finally completed retardation film is obtained.

The thickness of the retardation film of the present invention is preferably 20-200 μm, more preferably 20-60 μm, and further more preferably 20-50 μm. When the thickness of the film is less than 20 μm, the mechanical strength of the film may be insufficient and a trouble in the production process such as rupture of the film as well as roughening of the film surface tends to occur. Further, the effect of the heat treatment is outstanding in the thicknesses of 20-200 μm.

<Polarizing Plate and Liquid Crystal Display>

The polarizing plate of the present invention will be explained.

The polarizing plate of the present invention is producible by a general method. For example, applicable is a method in which, after carrying out alkali saponification treatment of the cellulose derivative film which is the retardation film of the present invention, the cellulose derivative film is adhered on both surfaces of a polarizer film using an aqueous solution of fully saponified polyvinylalcohol.

The saponification refers to a treatment in which the cellulose derivative film is immersed in a high temperature strong alkali solution in order to improve the wetting of an aqueous adhesive and to improve the adhesion property.

As a polarizer used in the polarizing plate of the present invention, a polarizer known in the art is applicable. For example, applicable is: (i) a hydrophilic film such as a polyvinylalcohol film or an ethylene modified polyvinylalcohol film having 1-4 mole % ethylene unit, and exhibiting polymerization degree of 2000-4000 and saponification degree of 99.0-99.9%, obtained by stretching after treated with a dichromatic dye such as iodine, or (ii) an oriented film obtained by treating a plastic film such as vinyl chloride.

The thickness of a polarizer is preferably 5-30 μm. Thus obtained polarizer is laminated with the cellulose derivative film.

The retardation film of the present invention is used as at least one of the cellulose derivatives. On the other surface of the polarizer, a different cellulose derivative film may be used.

The retardation film of the present invention may also be used on the other surface of the polarizer, or a cellulose ester film available on the market (KC8UX2M, KC4UX2M, KC5UN, KC4UY, KC8UY, all are produced by Konica Minolta Opto, Inc.) may be used on the other surface of the polarizer as a polarizing plate protective film.

The polarizing plate protective film used on the outer side (viewer side) of a display preferably has, for example, an antireflection layer, an antistatic layer or an anti-stain layer, in addition to an anti-glare layer or a clear hardcoat layer.

Further, at the time of production of a polarizing plate, the retardation film of the present invention is preferably adhered with the polarizer so that the in-plane slow axis of the retardation film is parallel or orthogonal with the transmission axis of the polarizer.

The liquid crystal display of the present invention is fabricated by adhering the polarizing plates of the present invention on both surfaces of a liquid crystal cell. The retardation film of the present invention can be preferably used in a liquid crystal display of various driving modes such as TN mode, VA mode, OCB mode or HAN mode.

EXAMPLES

In the following, the present invention will be explained referring to an example.

<Preparation of Retardation Film>
<Preparation of Retardation Film A>
<Preparation of particle Dispersion>

Particle Aerosil R972V (manufactured by Nippon Aerosil Co., Ltd.) 11 mass parts

Ethanol 89 mass parts

The above composition was dispersed by a Manton-Gaulin homogenizer after having been mixed with stirring for 50 minutes by a dissolver, whereby particle dispersion was prepared.

<Preparation of Particle Additive Solution>

Cellulose ester described below was added into a dissolving tank charged with methylene chloride to be completely dissolved with heating, and the resulting solution was filtered through Azumi Filter Paper No. 244 manufactured by Azumi Filter Paper Co., Ltd.

The cellulose ester solution after having been filtered was slowly added with particle dispersion with sufficient stirring. Further, the solution was subjected to dispersion by use of an atliter. The resulting solution was filtered through Finemet NF manufactured by Nippon Seisen Co., Ltd. to prepare a particle additive solution.

Methylene chloride 99 mass parts

Cellulose ester (acetyl group substitution degree of 1.2, propionyl group substitution degree of 1.2) 4 mass parts Particle dispersion 11 mass parts (Preparation of Primary Dope Solution)

The primary dope solution having the following composition was prepared. Firstly, methylene chloride and ethanol were added into a pressure dissolution tank. A part (approximately 40 weigh parts) of methylene chloride was separated in advance and sellulose ester was charged into the pressure dissolution tank filled with the solvent while stirring.

The system was heated and completely dissolved with stirring and further added with a plasticizer to be dissolved. The resulting solution was filtered through Azumi Filter Paper No. 244 manufactured by Azumi Filter Paper Co., Ltd. to prepare a primary dope solution.

A primary dope solution of 100 mass parts was added with a particle additive solution of 2 mass parts and sufficiently mixed through an in-line mixer (Static In-line Mixer Hi-Mixer SWJ, manufactured by Toray Industries, Inc.), and then the resulting dope was uniformly cast on a stainless band support of 2 m wide by use of a belt casting system.

The solvent was evaporated on the stainless band support until the residual solvent amount reached 110 mass % and then a web was peeled off from the stainless band support.

The web was applied with tension at the time of peeling-off to keep a stretching ratio in the longitudinal (MD) direction of 1.0, and then the both edges of the web were held by a tenter part to be stretched, while varying a type of cellulose ester, a type and an addition amount of a plasticizer, heat treatment temperature before stretching, temperature to start stretching and stretching ratio in the width (TD) direction as described in table 1.

After stretching, the web was held as it was for a few seconds while keeping the width, the width holding being released after tension of the width direction was relaxed, and the web was further dried by being passed through a drying zone kept at 110° C. over 30 minutes to reduce the residual solvent to not more than 0.1 mass %.

In the above operation, retardation films 1-15, having a width of 1.5 m, a roll length of 3,000 m and knurling of 1 cm wide and 8 µm height at the edges, were pepared.

Herein, Tg (a) was measured using the retardation film prepared in advance as a trial production. Tg (a) of retardation films 1-12 was 155° C. And Tg (a) of comparative films 13-15 was 135° C.

<Composition of Primary Dope Solution>

| | |
|---|---|
| Methylene chloride | 300 mass parts |
| Ethanol | 52 mass parts |
| Cellulose ester (acetyl group substitution degree of 1.2, propionyl group substitution degree of 1.2) | 100 mass parts |
| Plasticizer A (2-16) | 5 mass parts |
| Plasticizer B (1-1) | 5 mass parts |

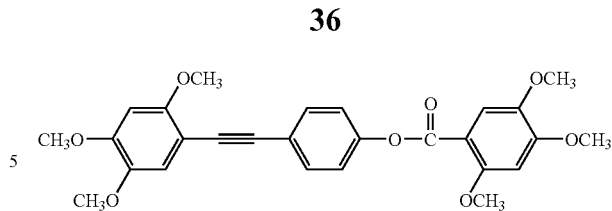

<Preparation of Polarizing Plate>

Utilizing a roll sample of retardation film prepared above, the following alkaline saponification treatment was conducted to prepare a polarizing plate.

<Alkaline Saponification Treatment>

| | | |
|---|---|---|
| Saponification Process: | 2M NaOH | 50° C., 90 seconds |
| Washing Process: | Water | 30° C., 45 seconds |
| Neutralization Process: | 10 mass % HCl | 30° C., 45 seconds |
| Washing process: | Water | 30° C., 45 seconds |

Washing, neutralization and washing were conducted in this order after the saponification treatment, and then dried at 80° C.

<Preparation of Polarizer>

Long roll polyvinyl alcohol film having a thickness of 120 µm was immersed in an aqueous solution of 100 mass parts containing 1 mass part of iodine and 4 mass parts of boric acid, and then stretched by 6 times along the transporting direction at 50° C. to prepare a polarizer.

TABLE 1

| Film No. | Cellulose ester *1 | *2 | Type of plastisizer A | B | C | Amount of plastisizer A | B | C | Heat treatment temperature (° C.) | Tg(a) + Δ Δ(° C.) | Temperature to start stretching (° C.) | Stretching Ratio MD | TD | Layer thickness (µM) | Remarks |
|---|---|---|---|---|---|---|---|---|---|---|---|---|---|---|---|
| 1 | 1.2 | 1.2 | 2-16 | 1-1 | — | 5.0 | 5.0 | — | 195 | 40 | 155 | 1.0 | 1.36 | 50 | Inv. |
| 2 | 1.2 | 1.2 | 2-16 | 1-1 | — | 5.0 | 5.0 | — | 185 | 30 | 145 | 1.0 | 1.26 | 50 | Inv. |
| 3 | 1.2 | 1.2 | 2-16 | 1-1 | — | 5.0 | 5.0 | — | 175 | 20 | 145 | 1.0 | 1.26 | 55 | Inv. |
| 4 | 1.2 | 1.2 | 2-16 | 1-1 | — | 5.0 | 5.0 | — | 165 | 10 | 150 | 1.0 | 1.36 | 45 | Inv. |
| 5 | 1.2 | 1.2 | 2-16 | 1-1 | — | 5.0 | 5.0 | — | 165 | 10 | 165 | 1.0 | 1.36 | 40 | Inv. |
| 6 | 1.2 | 1.2 | 2-16 | 1-1 | — | 5.0 | 5.0 | — | 175 | 20 | 135 | 1.0 | 1.36 | 45 | Inv. |
| 7 | 1.2 | 1.0 | 2-16 | 1-1 | — | 5.0 | 5.0 | — | 185 | 30 | 145 | 1.0 | 1.33 | 150 | Inv. |
| 8 | 1.2 | 1.2 | 2-16 | 1-1 | — | 5.0 | 5.0 | — | 155 | 0 | 160 | 1.0 | 1.36 | 43 | Comp. |
| 9 | 1.2 | 1.2 | 2-16 | 1-1 | — | 5.0 | 5.0 | — | 135 | −20 | 135 | 1.0 | 1.34 | 43 | Comp. |
| 10 | 1.2 | 1.2 | 2-16 | 1-1 | — | 5.0 | 5.0 | — | 205 | 50 | 145 | 1.0 | 1.38 | 45 | Comp. |
| 11 | 1.2 | 1.2 | 2-16 | 1-1 | — | 5.0 | 5.0 | — | 150 | −5 | 150 | 1.0 | 1.34 | 43 | Comp. |
| 12 | 1.2 | 1.2 | a | b | — | 8.5 | 2.0 | — | 165 | 10 | 150 | 1.0 | 1.36 | 45 | Comp. |
| 13 | 2.0 | 0.8 | a | b | — | 8.5 | 2.0 | — | 130 | −5 | 130 | 1.0 | 1.32 | 80 | Comp. |
| 14 | 1.95 | 0.9 | a | b | c | 9.0 | 3.5 | 2.8 | 130 | −5 | 130 | 1.0 | 1.30 | 45 | Comp. |
| 15 | 1.95 | 0.9 | a | b | c | 9.0 | 3.5 | 2.8 | 130 | −5 | 130 | 1.0 | 1.32 | 80 | Comp. | a: Triphenyl phosphate,
b: Ethylphthalyl ethylglycorate
c: Specific compound B-6 described in JP-A 2006-154803
Inv.: Invention,
Comp.: Comparison
*1: Acetyl group substitution degree,
*2: Propionyl group substitution degree Utilizing retardation films 1-15 prepared as above, a polarizing plate and a liquid crystal display were prepared in the following manner.

Herein, plasticizer c (specific compound B-6 described in JP-A 2006-154803) is a compound having the following structure.

KC 8UX manufactured by Konica Minolta Opto Inc. on the one surface of the above-described polarizer, and the aforesaid retardation film having been subjected to an alkaline saponification treatment on the opposite surface, each were pasted up in roll-to roll manner so as to make the transparent axis of the polarizer and the slow axis in the film plane to be parallel, by use of a 5% aqueous solution of completely saponificated polyvinyl alcohol as an adhesive, followed by being dried to prepare polarizing plates 1-15.

<Preparation of Liquid Crystal Display>

Polarizing plates having been laminated on both surfaces the liquid crystal cell of 40 Type Display KLV-40V 1000, manufactured by Sony Corp. were removed and the polarizing plates of the present invention were adhered using an adhesive on both surfaces on the liquid crystal cell so that the retardation films of the present invention face the glass plates on both surfaces of the liquid crystal cell and the transmission axis of each polarizing plate lies in the same direction as the transmission axis of the preliminarily adhered polarizing plate. In this way, liquid crystal displays 1-15 were prepared.

<Evaluation of Retardation Film and Liquid Crystal Display>

Evaluation of the prepared retardation films, the polarizing plates and the liquid crystal displays were conducted according to the following method.

<Evaluation of Retardation Film>

[Measurement of Ro, Rt]

The mean refractive index of the constituent materials of film was measured by use of Abbe's refractometer (4T). Further, the thickness of each film was measured by use of a micrometer available on the market.

By use of an automatic birefringence analyzer KOBRA-21ADH (manufactured by Oji Scientific Instruments), retardation of each film having been kept under an environment of 23° C. and 55% RH for 24 hours was measured at a wavelength of 590 nm under the same environment. The above-described mean refractive index and layer thickness were input in an equation to determine the values of in-plane retardation (Ro) and retardation in the thickness direction (Rt).

[Measurement of Haze]

By use of a turbidimeter (NDH 2000, manufactured by Nippon Denshoku Co. Ltd.), with respect to film having been kept under an environment of 23° C. and 55% RH for 24 hours, haze was measured under the same environment.

Total haze (Htotal) A haze value (%) measured base on JISK 7136.

Internal haze (Hi): A value of haze (%) of each retardation film measured in a state of being sandwiched between two sheets of glass plates having a thickness of 1.3 mm (Micro Slide Glass, product No. S 9213, manufactured by Matsunami Glass Ind., Ltd.), while a few drops of glycerin were preliminarily applied on both surfaces of the retardation film, minus haze (%) measured in a state of a few drops of glycerin being added drop-wise between the two sheets of glass plates.

<Evaluation of Liquid Crystal Display>

[Front Contrast]

The measurement was conducted after a backlight of each liquid crystal display had been continuously lit for one hour under an environment of 23° C. and 55% RH. In the measurement, luminance was measured from the vertical direction of the display image plane of a liquid crystal display at white display and at black display by use of EZ-Contrast 160D, manufactured by ELDIM Corp., and the ratio of the luminance was defined as front contrast as follows.

Front contrast=(luminance at white display measured from the vertical direction of a display)/(luminance at black display measured from the vertical direction of a display)

Front contrasts at arbitrary 5 points of a liquid crystal display were measured and evaluation was made according to the following criteria.

A: 1,100-1,200
B: 1,000-less than 1,100
C: Less than 1,000

[Evaluation of Reflection Color Unevenness]

With respect to each liquid crystal display, visual evaluation of reflection color unevenness was made on the surface of an image plane at black display.

A: No reflection color unevenness is observed
B: Slight reflection color unevenness is recognized.
C: Notable reflection color unevenness is observed.

The above results will be shown in tables 2 and 3.

TABLE 2

| Film No. | Retardation | | Haze | | | |
|---|---|---|---|---|---|---|
| | Ro (nm) | Rt (nm) | Total | Internal | Internal/Total (Hi/Htotal) | Remarks |
| 1 | 52 | 90 | 0.35 | 0.10 | 0.29 | Invention |
| 2 | 40 | 100 | 0.10 | 0.05 | 0.50 | Invention |
| 3 | 42 | 120 | 0.20 | 0.04 | 0.20 | Invention |
| 4 | 50 | 110 | 0.30 | 0.10 | 0.33 | Invention |
| 5 | 40 | 100 | 0.40 | 0.15 | 0.38 | Invention |
| 6 | 55 | 120 | 0.30 | 0.15 | 0.50 | Invention |
| 7 | 150 | 320 | 0.30 | 0.15 | 0.50 | Invention |
| 8 | 40 | 110 | 1.10 | 0.10 | 0.09 | Comparison |
| 9 | 50 | 145 | 0.50 | 0.20 | 0.40 | Comparison |
| 10 | 60 | 80 | 0.35 | 0.20 | 0.57 | Comparison |
| 11 | 45 | 115 | 1.50 | 0.90 | 0.60 | Comparison |
| 12 | 45 | 100 | 0.70 | 0.20 | 0.29 | Comparison |
| 13 | 30 | 100 | 1.00 | 0.50 | 0.50 | Comparison |
| 14 | 25 | 65 | 0.60 | 0.20 | 0.33 | Comparison |
| 15 | 45 | 120 | 1.10 | 0.50 | 0.45 | Comparison |

TABLE 3

| Polarizing plate No. | Liquid crystal display No. | Front contrast | Reflection Color Unevenness | Remarks |
|---|---|---|---|---|
| 1 | 1 | B | B | Invention |
| 2 | 2 | A | B | Invention |
| 3 | 3 | A | B | Invention |
| 4 | 4 | B | B | Invention |
| 5 | 5 | B | B | Invention |
| 6 | 6 | B | B | Invention |
| 7 | 7 | B | B | Invention |
| 8 | 8 | C | C | Comparison |
| 9 | 9 | C | C | Comparison |
| 10 | 10 | C | C | Comparison |
| 11 | 11 | C | C | Comparison |
| 12 | 12 | C | C | Comparison |
| 13 | 13 | C | C | Comparison |
| 14 | 14 | C | C | Comparison |
| 15 | 15 | C | C | Comparison |

It has been proved from the above tables that a liquid crystal display exhibiting high front contrast can be provided by utilizing retardation film of the present invention.

What is claimed is:

1. A retardation film comprising a cellulose derivative and a plasticizer, wherein
a total haze, Htotal, and an internal haze, Hi, of the retardation film respectively meet the following conditions:

$$0.1\% \leq H\text{total} \leq 0.4\% \text{ and}$$

$$0.02\% \leq Hi \leq 0.2\% \text{ and}$$

a ratio of the internal haze to the total haze, Hi/Htotal, of the retardation film meets the following condition:

$$Hi/H\text{total} \leq 0.5,$$

wherein
the total haze (%) represents a haze measured according to a method of JIS K7136 (identical with ISO 14782: 1999); and
the internal haze (%) represents a haze obtained by the following steps:
(i) measuring a haze of the retardation film by applying glycerin on both surfaces of the retardation film and sandwiching the retardation film with two glass plates each having a thickness of 1.3 mm; and
(ii) measuring a haze of the two glass plates by putting the two glass plates together on top of each other while applying glycerin between the two glass plates; and
(iii) subtracting the haze obtained in step (ii) from the haze obtained in step (i) to give the internal haze.

2. The retardation film of claim 1, wherein the ratio of the internal haze no the total haze of the retardation film meets the following condition:

$$0.2 \leq Hi/Htotal \leq 0.5.$$

3. The retardation film of claim 1, wherein the retardation film comprises a polyester plasticizer having a number average molecular weight of 300 or more and less than 2000.

4. A polarizing plate comprising the retardation film of claim 1.

5. A liquid crystal display comprising the retardation film of claim 1.

6. A method of producing a retardation film comprising a cellulose derivative and a plasticizer comprising the steps of:
(a) dissolving a cellulose derivative and a plasticizer in an organic solvent to form a dope
(b) casting the dope on a metal support to form a web;
(c) drying the web on the metal support;
(d) peeling the web from the metal support;
(e) heat treating the peeled web at a temperature of Tg(a)+ 10° C. to Tg(a)+40° C., Tg(a) being a glass transition temperature of the retardation film;
(f) stretching the heat treated web; and
(g) winding the web in a role,
wherein
a total haze, Htotal, and an internal haze, Hi, of the retardation film meet the following condition:

$$0.1\% \leq Htotal \leq 0.4\% \text{ and}$$

$$0.02\% \leq Hi \leq 0.2\%; \text{ and}$$

a ratio of the internal haze to the total haze, Hi/Htotal, of the retardation film meets the following condition:

$$Hi/Htotal \leq 0.5,$$

wherein
the total haze (%) represents a haze measured according to a method of JIS K7136 (identical with ISO 14782: 1999); and
the internal haze (%) represents a haze obtained by the following steps:
(i) measuring a haze of the retardation film by applying glycerin on both surfaces of the retardation film and sandwiching the retardation film with two glass plates each having a thickness of 1.3 mm; and
(ii) measuring a haze of the two glass plates by putting the two glass plates together on top of each other while applying glycerin between the two glass plates; and
(iii) subtracting the haze obtained in step (ii) from the haze obtained in step (i) to give the internal haze.

7. The method of claim 6, wherein the ratio of the internal haze to the total haze of the retardation film meets the following condition:

$$0.2 \leq Hi/Htotal \leq 0.5.$$

8. The method of claim 6, wherein the retardation film comprises a polyester plasticizer having a number average molecular weight of 300 or more and less than 2000.

* * * * *